(12) United States Patent
Miyashita (10) Patent No.: US 9,242,492 B2
(45) Date of Patent: Jan. 26, 2016

(54) RECORDING APPARATUS AND SETTING METHOD

(71) Applicant: SEIKO EPSON CORPORATION, Tokyo (JP)

(72) Inventor: Daisuke Miyashita, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/559,802

(22) Filed: Dec. 3, 2014

(65) Prior Publication Data

US 2015/0158314 A1 Jun. 11, 2015

(30) Foreign Application Priority Data

Dec. 6, 2013 (JP) ................................. 2013-253385

(51) Int. Cl.
*G11B 5/027* (2006.01)
*B41J 15/04* (2006.01)
*B41J 11/42* (2006.01)

(52) U.S. Cl.
CPC *B41J 15/04* (2013.01); *B41J 11/42* (2013.01); *G11B 5/027* (2013.01)

(58) Field of Classification Search
CPC .................................. G11B 5/027; G11B 5/008
USPC ............................................................ 360/85
See application file for complete search history.

(56) References Cited

U.S. PATENT DOCUMENTS

| 4,149,203 A | * | 4/1979 | Kobayashi et al. ............. 360/60 |
| 4,187,429 A | * | 2/1980 | Tomita et al. .................... 378/17 |
| 7,215,093 B2 | | 5/2007 | Usui et al. |
| 7,786,688 B2 | | 8/2010 | Hayashi et al. |

FOREIGN PATENT DOCUMENTS

| JP | 2004-282897 | 10/2004 |
| JP | 2007-159296 | 6/2007 |
| JP | 2010-052380 | 3/2010 |

* cited by examiner

*Primary Examiner* — Allen T Cao
(74) *Attorney, Agent, or Firm* — Workman Nydegger (57) ABSTRACT

A recording apparatus includes a support shaft that supports a roll-shaped recording medium; a motor that applies a rotational force to the support shaft; a motor control section that controls the motor; and a recording section that performs recording on the recording medium transported from the support shaft, in which the motor control section is capable of controlling the motor so that the motor alternately enters a braking state and a non-braking state.

6 Claims, 4 Drawing Sheets

RECORDING APPARATUS AND SETTING METHOD

BACKGROUND

1. Technical Field

The present invention relates to a recording apparatus and a setting method.

2. Related Art

In the related art, a recording apparatus that performs recording on a roll-shaped recording medium has been used. As such a recording apparatus, an apparatus including a motor for rotating a roll of the recording medium to transport the roll-shaped recording medium is often used. For example, a recording apparatus capable of intermittently driving a motor to intermittently transport a roll-shaped recording medium is disclosed in JP-A-2010-52380.

Furthermore, as a motor driving circuit capable of changing a rotating direction of a motor, a motor driving circuit having an H-bridge configuration is used as disclosed in JP-A-2007-159296.

Generally, when setting the recording medium in a recording apparatus that performs recording on the roll-shaped recording medium, first, the recording medium is manually introduced to a transportation path of the recording medium. At this time, the motor is rotated for rotating the roll of the recording medium, and thereby a counter electromotive force is generated and adverse influences in which a high voltage is applied to or a high current is supplied to a motor control section may affect the motor control section and the like. Thus, in order to suppress adverse influences on the motor control section, a discharge circuit is provided and the like, and thereby the apparatus is complicated and the cost is increased.

Here, in JP-A-2010-52380, there is a description of performing braking to intermittently drive the motor, but there is no description of the counter electromotive force when manually introducing the recording medium to the transportation path of the recording medium.

Furthermore, in JP-A-2007-159296, there is a configuration to suppress the counter electromotive force that is generated when stopping the rotating motor by supplying a current to one of a high-side transistor and a low-side transistor (a so-called short brake). However, there is no configuration to suppress the counter electromotive force that is generated by rotating the stopped motor such as when setting the recording medium.

Thus, when manually introducing the recording medium to the transportation path of the recording medium, it is preferable to suppress that the motor generates the counter electromotive force and that adverse influences affect the motor control section and the like.

SUMMARY

An advantage of some aspects of the invention is to suppress that a motor generates a counter electromotive force and adverse influences affect a motor control section and the like when manually introducing a recording medium to a transportation path of the recording medium.

According to an aspect of the invention, there is provided a recording apparatus including: a support shaft that supports a roll-shaped recording medium; a motor that applies a rotational force to the support shaft; and a motor control section that controls the motor, in which the motor control section is capable of controlling the motor so that the motor alternately enters a braking state and a non-braking state.

In this case, the motor control section is capable of controlling the motor so that the motor alternately enters the braking state and the non-braking state. That is, when manually introducing the recording medium to a transportation path of the recording medium, it is possible to control the motor so that the motor alternately enters the braking state and the non-braking state. The motor is controlled so that the motor alternately enters the braking state and the non-braking state, and thereby when manually introducing the recording medium to the transportation path of the recording medium, that is, when pulling the recording medium from the support shaft, a heavy state (braking state) and a light state (non-braking state) are alternately repeated. A momentum when pulling the recording medium from the support shaft is weakened and rapid rotation of the motor is suppressed by alternately repeating the heavy state and the light state. Thus, when manually introducing the recording medium to the transportation path of the recording medium, it is possible to suppress that the motor generates the counter electromotive force and adverse influences in which a high voltage is applied to or a high current is supplied to a motor control section affect a motor control section and the like.

Moreover, the "braking state" means a state where a reaction force is applied against a pulling force when pulling the recording medium from the support shaft and the "non-braking state" means a state where the reaction force is not applied against the pulling force when pulling the recording medium from the support shaft.

The recording apparatus may further include: a recording medium detection section that is provided in a transportation path of the recording medium and detects the recording medium, in which the motor control section may control the motor so that the motor alternately enters the braking state and the non-braking state if the recording medium detection section detects the recording medium in a state where the motor does not apply the rotational force.

In this case, the motor control section controls the motor so that the motor alternately enters the braking state and the non-braking state if the recording medium detection section detects the recording medium in a state where the motor does not apply the rotational force. That is, when manually introducing the recording medium to the transportation path of the recording medium, the motor control section controls the motor so that the motor alternately enters the braking state and the non-braking state according to detection of the recording medium by the recording medium detection section. Thus, when manually introducing the recording medium to the transportation path of the recording medium, it is possible to suppress that the motor generates the counter electromotive force and adverse influences affect the motor control section and the like.

In the recording apparatus, the motor control section may control the motor so that the motor alternately enters the braking state and the non-braking state at an interval of 100 ms or greater and 1000 ms or less.

In this case, the motor control section controls the motor so that the motor alternately enters the braking state and the non-braking state at an interval of 100 ms or greater and 1000 ms or less. As a result that inventors of the invention have studied intensively, if control is performed so that the motor alternately enters the braking state and the non-braking state at the interval of 100 ms or greater and 1000 ms or less, specifically, it has been found that a momentum when pulling the recording medium from the support shaft is weakened and rapid rotation of the motor is suppressed. Thus, when manually introducing the recording medium to the transportation path of the recording medium, it is possible to effectively suppress that the motor generates the counter electromotive force and adverse influences affect the motor control section and the like.

The recording apparatus may further include: a motor driving circuit that has an H-bridge configuration including the motor, a first switch element connected to a power supply terminal and one end of a coil of the motor, a second switch element connected to the power supply terminal and the other end of the coil of the motor, a third switch element connected to a ground terminal and the one end of the coil of the motor, and a fourth switch element connected to the ground terminal and the other end of the coil of the motor. The motor control section may turn off the first switch element and the second switch element, and may turn on the third switch element and the fourth switch element in the braking state. The motor control section may turn off all of the first switch element, the second switch element, the third switch element, and the fourth switch element in the non-braking state.

In this case, it is possible to simply realize the braking state and the non-braking state by using the motor driving circuit having the H-bridge configuration.

The recording apparatus may further include: a clamping section that is capable of clamping the recording medium in the transportation path of the recording medium, in which the motor control section may control the motor so that the motor enters the non-braking state if the recording medium is in a clamped state by the clamping section.

In this case, the motor control section controls the motor so that the motor enters the non-braking state if the recording medium is in the clamped state by the clamping section. Since the clamping section clamps the recording medium and then setting of the recording medium is completed, if the recording medium is in the clamped state, it is not necessary for the motor control section to control the motor so that the motor alternately enters the braking state and the non-braking state. Thus, if the recording medium is in the clamped state, the motor control section can stop the control of the motor alternately entering the braking state and the non-braking state.

The recording apparatus may further include: a counter electromotive force detection section detecting that the motor generates a counter electromotive force of a predetermined threshold or more. The motor control section may control the motor so that the motor alternately enters the braking state and the non-braking state after the counter electromotive force detection section detects the counter electromotive force of the threshold or more.

In this case, the motor control section controls the motor so that the motor alternately enters the braking state and the non-braking state after the counter electromotive force detection section detects the counter electromotive force of the threshold or more. Thus, if adverse influences do not affect the motor control section and the like even if the counter electromotive force is generated, the control of the motor by the motor control section can be omitted.

Moreover, for example, the "predetermined threshold" may be predetermined by a user from a viewpoint of a value in which the adverse influences affect the motor control section and the like.

According to another aspect of the invention, there is provided a setting method for setting a recording medium on a recording apparatus including a support shaft that supports a roll-shaped recording medium, a motor that applies a rotational force to the support shaft, and a motor control section that controls the motor, in which the motor control section controls the motor so that the motor alternately enters a braking state and a non-braking state when manually introducing the recording medium to a transportation path of the recording medium.

In this case, when manually introducing the recording medium to the transportation path of the recording medium, the motor control section controls the motor so that the motor alternately enters the braking state and the non-braking state. Thus, when manually introducing the recording medium to the transportation path of the recording medium, it is possible to suppress that the motor generates the counter electromotive force and adverse influences affect the motor control section and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a recording apparatus according to an embodiment of the invention will be described in detail with reference to the accompanying drawings.

First Embodiment

Figure 1:
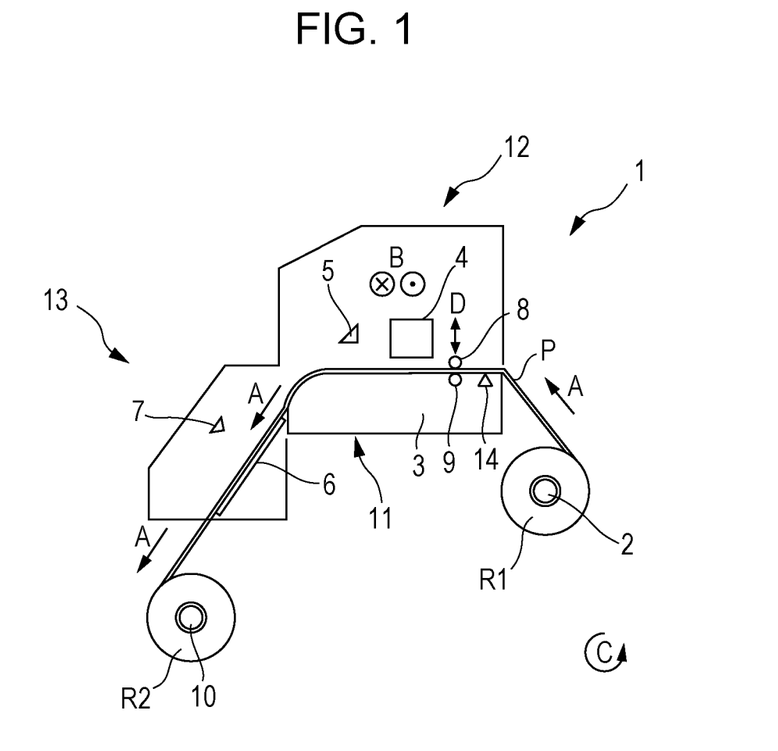
FIG. 1 is a schematic side view illustrating a recording apparatus according to a first embodiment of the invention.
Figure 2:
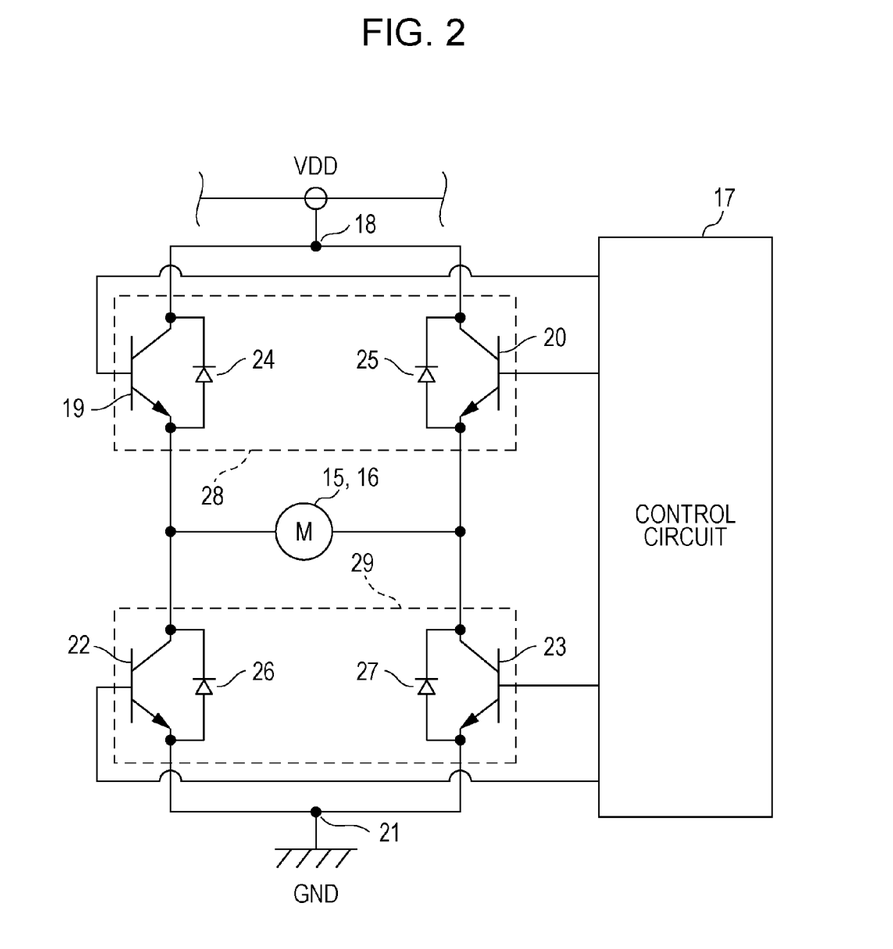
FIG. 2 is a diagram of a motor driving circuit of the recording apparatus according to the first embodiment of the invention.

FIGS. 1 and 2

Firstly, a recording apparatus according to a first embodiment of the invention will be described.

FIG. 1 is a schematic side view illustrating a recording apparatus 1 according to the embodiment.

The recording apparatus 1 of the embodiment includes a support shaft 2 that supports a roll R1 of a roll-shaped recording medium P on which the recording is performed. Then, in the recording apparatus 1 of the embodiment, when transporting the recording medium P in a transportation direction A, the support shaft 2 is rotated in a rotating direction C by driving a motor 15 (see FIG. 2) to be rotated. Moreover, in the embodiment, the roll-type recording medium P that is wound such that a recording surface is on the outside is used, but if a roll-type recording medium P that is wound such that a recording surface is on the inside is used, it is possible to feed the roll R1 in a direction reverse to the rotating direction C of the support shaft 2.

Furthermore, the recording apparatus 1 of the embodiment includes a transportation mechanism 11 having a pair of transport rollers (clamping section) that is configured of a transport roller 9 and a driven roller 8 that is capable of moving in a direction D to transport the recording medium P in the transportation direction A. The transportation mechanism 11 is provided with a platen heater 5 that is capable of heating the recording medium P supported on a platen 3.

Moreover, the platen heater 5 of the embodiment is an infrared heater that is provided in a position facing the platen 3 and is capable of heating a surface of the recording medium P at 35° C. to 50° C., but is not limited to such a heater and a heater that is capable of heating the recording medium P on the side of the platen 3 may be used. Here, a wavelength of the infrared is preferably 0.76 μm to 1000 μm. Generally, according to the wavelength, the infrared is divided into near infrared, mid-infrared, and far infrared, and definition of the division varies, but wavelength ranges thereof are 0.78 μm to 2.5 μm, 2.5 μm to 4.0 μm, and 4.0 μm to 1000 μm, respectively. Specifically, the mid-infrared is preferably used.

Furthermore, the transportation mechanism 11 includes a recording medium detection section 14 that detects the recording medium P in the transportation path of the recording medium P. The recording medium detection section 14 of the embodiment is an optical sensor and is configured to detect presence or absence of the recording medium P in a portion in which the recording medium detection section 14 is provided by detecting whether or not irradiation light irradiated from the optical sensor is reflected on the recording medium P and reflected light is detected. However, the recording medium detection section 14 is not limited to such a configuration.

Furthermore, the recording apparatus 1 of the embodiment includes a recording mechanism 12 that performs recording by reciprocally scanning a recording head 4 as a recording section in a direction B intersecting the transportation direction A of the recording medium P. Moreover, the recording apparatus 1 of the embodiment includes the recording mechanism 12 that performs the recording by reciprocally scanning the recording head 4, but the recording apparatus 1 may be a recording apparatus including a so-called line head in which a plurality of nozzles ejecting ink are provided in the direction B intersecting the transportation direction A.

Here, the "line head" is a recording head that is used in a recording apparatus in which a region of the nozzles formed in the direction B intersecting the transportation direction A of the recording medium P is provided so as to cover an entirety of the recording medium P in the direction B and an image is formed by fixing one of the recording head and the recording medium and moving the other thereof. Moreover, the region of the nozzles of the line head in the direction B may not cover the entirety of the recording medium P in the direction B which is handled by the recording apparatus.

Furthermore, the region of the nozzles of the recording head is provided so as to cover the entirety of the recording medium P in the direction B intersecting the transportation direction A of the recording medium P and the image may be formed by moving both the recording head and the recording medium.

A drying mechanism 13 that dries the recording medium P transported to a medium support section 6 by an after heater 7 configured of an infrared heater as a drying section is provided on a downstream side of the transportation mechanism 11 and the recording mechanism 12 in the transportation direction A of the recording medium P. The after heater 7 is the infrared heater capable of heating the surface of the recording medium P at 60° C. to 120° C. to dry the ink that is used in the recording apparatus 1 of the embodiment, but the after heater 7 is not limited to such a heater. Furthermore, as the drying section, a blower and the like such as a fan may be used in addition to a heating device such as the infrared heater.

Furthermore, a winding shaft 10 capable of winding the recording medium P as a roll R2 is provided on the downstream side of the drying mechanism 13 in the transportation direction A of the recording medium P. Moreover, in the embodiment, since the roll type recording medium P is used that is wound such that the recording surface is on the outside, when winding the recording medium P, the winding shaft 10 is rotated in the rotating direction C by driving a winding motor 16 (see FIG. 2) to be rotated. In contrast, if the roll type recording medium P is used that is wound such that the recording surface is on the inside, it is possible to wind the roll R1 in the direction reverse to the rotating direction C.

Next, a motor driving circuit in the recording apparatus 1 of the embodiment will be described.

FIG. 2 is a diagram of the motor driving circuit of the recording apparatus 1 according to the embodiment.

Moreover, FIG. 2 is a diagram of the motor driving circuit of the motor 15 driving the support shaft 2 and the diagram of the motor driving circuit of the motor 15 will be described.

The motor driving circuit of the recording apparatus 1 of the embodiment is a motor driving circuit having an H-bridge configuration that has a control circuit 17 as a motor control section, and is capable of controlling the motor 15 so that the motor 15 alternately enters a braking state and a non-braking state by the control of the control circuit 17.

Here, the "braking state" means a state where a reaction force is applied against a pulling force when pulling the recording medium P from the support shaft 2. For example, the braking state is a state where the motor 15 is controlled to be driven to rotate or a state where the motor 15 is controlled to stop the rotation thereof. Moreover, in the embodiment, "state where the motor 15 is controlled to stop the rotation thereof" specifically corresponds to a state where a short brake is applied. Furthermore, "non-braking state" means a state where the reaction force is not applied against the pulling force when pulling the recording medium P from the support shaft 2. That is, the non-braking state means a state where the motor 15 is not controlled not only so as to be driven to be rotated and but also so as to stop the rotation thereof. Moreover, in the embodiment, the "state where the motor 15 is not controlled not only so as to be driven to be rotated and but also so as to stop the rotation thereof" specifically corresponds to a state where all switch circuits described below configuring the H-bridge are turned off.

As described above, the control circuit 17 of the embodiment is capable of controlling the motor 15 so that the motor 15 alternately enters the braking state and the non-braking state. That is, when manually introducing the recording medium P to the transportation path of the recording medium P, it is possible to control the motor 15 so that the motor 15 alternately enters the braking state and the non-braking state. The motor 15 is controlled so that the motor alternately enters the braking state and the non-braking state, and thereby when manually introducing the recording medium P to the transportation path of the recording medium P, that is, when pulling the recording medium P from the support shaft 2, a heavy state (braking state) and a light state (non-braking state) are alternately repeated. A momentum when pulling the recording medium P from the support shaft 2 is weakened and rapid rotation of the motor 15 is suppressed by alternately repeating the heavy state and the light state. Thus, when manually introducing the recording medium P to the transportation path of the recording medium P, it is possible to suppress that the motor 15 generates the counter electromotive force and adverse influences in which a high voltage is applied or a high current is supplied affect a power supply terminal 18, the control circuit 17 of the motor driving circuit, and the like.

Furthermore, as described above, the recording apparatus 1 of the embodiment includes the recording medium detection section 14 that detects the recording medium P in the transportation path of the recording medium P. Here, the control circuit 17 of the embodiment controls the motor 15 so that the motor 15 alternately enters the braking state and the non-braking state if the recording medium detection section 14 detects the recording medium P in a state where the motor 15 does not apply the rotational force.

That is, when manually introducing the recording medium P to the transportation path of the recording medium P, the control circuit 17 controls the motor 15 so that the motor 15 alternately enters the braking state and the non-braking state according to the detection of the recording medium P by the recording medium detection section 14. Thus, when manually introducing the recording medium P to the transportation path of the recording medium P, it is possible to suppress that the motor 15 generates the counter electromotive force and adverse influences affect the control circuit 17 of the motor driving circuit and the like.

Here, the motor driving circuit of the embodiment is described in detail. The motor driving circuit of the embodiment is a motor driving circuit that has the H-bridge configuration including the motor 15, a transistor 19 as a first switch element connected to the power supply terminal 18 and one end of a coil of the motor 15, a transistor 20 as a second switch element connected to the power supply terminal 18 and the other end of the coil of the motor 15, a transistor 22 as a third switch element connected to a ground terminal 21 and the one end of the coil of the motor 15, and a transistor 23 as a fourth switch element connected to the ground terminal 21 and the other end of the coil of the motor 15.

Furthermore, the control circuit 17 turns off the transistor 19 and the transistor 20, and turns on the transistor 22 and the transistor 23 in the braking state. That is, the transistors of a high side 28 are turned off and the transistors of a low side 29 are turned on, thereby being in a short brake state in which the current is supplied only to the low side 29.

On the other hand, the control circuit 17 turns off all of the transistor 19, the transistor 20, the transistor 22, and the transistor 23 in the non-braking state, and all transistors are in an open state.

Moreover, the control circuit 17 is to be a state where the voltage is applied to a base when the transistor is turned on and to be a state where the voltage is not applied to the base when the transistor is turned off.

Thus, the motor driving circuit of the embodiment simply realizes the braking state and the non-braking state by using the motor driving circuit having the H-bridge configuration.

Moreover, the motor driving circuit of the embodiment is provided with diodes 24 to 27 so that the transistor 19, the transistor 20, the transistor 22, and the transistor 23 are not damaged by the counter electromotive force.

When pulling the recording medium P from the support shaft 2 in a state where the braking state is continued (short brake state), there is a concern that a load is applied (unexpected voltage is applied) to at least one of the transistors of the motor driving circuit of the embodiment. On the other hand, when pulling the recording medium P from the support shaft 2 in a state where the non-braking state is continued (state where all transistors are open), there is a concern that an unexpected current is supplied to the motor driving circuit of the embodiment when exceeding the power supply voltage by the counter electromotive force.

However, as described above, in the motor driving circuit of the embodiment, the control circuit 17 controls the motor 15 so that the motor 15 alternately enters the braking state and the non-braking state. Thus, it is possible to suppress both the concern that the load is applied to at least one of the transistors of the motor driving circuit of the embodiment and the concern that an unexpected current is supplied to the motor driving circuit of the embodiment by the counter electromotive force.

Moreover, in the motor driving circuit of the embodiment, the control circuit 17 controls the motor 15 so that the motor 15 alternately enters the braking state and the non-braking state at an interval of 100 ms or greater and 1000 ms or less. As described above, it is preferable that the control be performed so that the motor 15 alternately enters the braking state and the non-braking state at the interval of 100 ms or greater and 1000 ms or less.

As a result that the inventors of the invention have performed intensive studies, if the control is performed so that the motor 15 alternately enters the braking state and the non-braking state at the interval of 100 ms or greater and 1000 ms or less, specifically, it has been found that a momentum when pulling the recording medium P from the support shaft 2 is weakened and rapid rotation of the motor 15 can be suppressed. Thus, when manually introducing the recording medium P to the transportation path of the recording medium P, it is possible to effectively suppress that the motor 15 generates the counter electromotive force and adverse influences affect the control circuit 17 of the motor driving circuit and the like by performing such control.

Furthermore, as described above, the recording apparatus 1 of the embodiment includes a pair of transport rollers (the driven roller 8 and the transport roller 9) as the clamping section capable of clamping the recording medium P in the transportation path of the recording medium P. Here, the control circuit 17 controls the motor 15 so that the motor 15 enters the non-braking state if the recording medium is in the clamped state by the pair of transport rollers. Specifically, the pair of transport rollers is connected to the control circuit 17 and the control circuit 17 is configured such that whether or not the recording medium is in the clamped state by the pair of transport rollers can be recognized.

Since setting of the recording medium P is completed by clamping the recording medium P by the pair of transport rollers, if the recording medium P is in the clamped state, it is not necessary for the control circuit 17 to control the motor 15 so that the motor 15 alternately enters the braking state and the non-braking state. Thus, if the recording medium P is in the clamped state, the control circuit 17 stops the control of the motor 15 alternately entering the braking state and the non-braking state and the control is switched from control when setting the recording medium P to control during standby for recording on the recording medium P.

Second Embodiment

Figure 3:
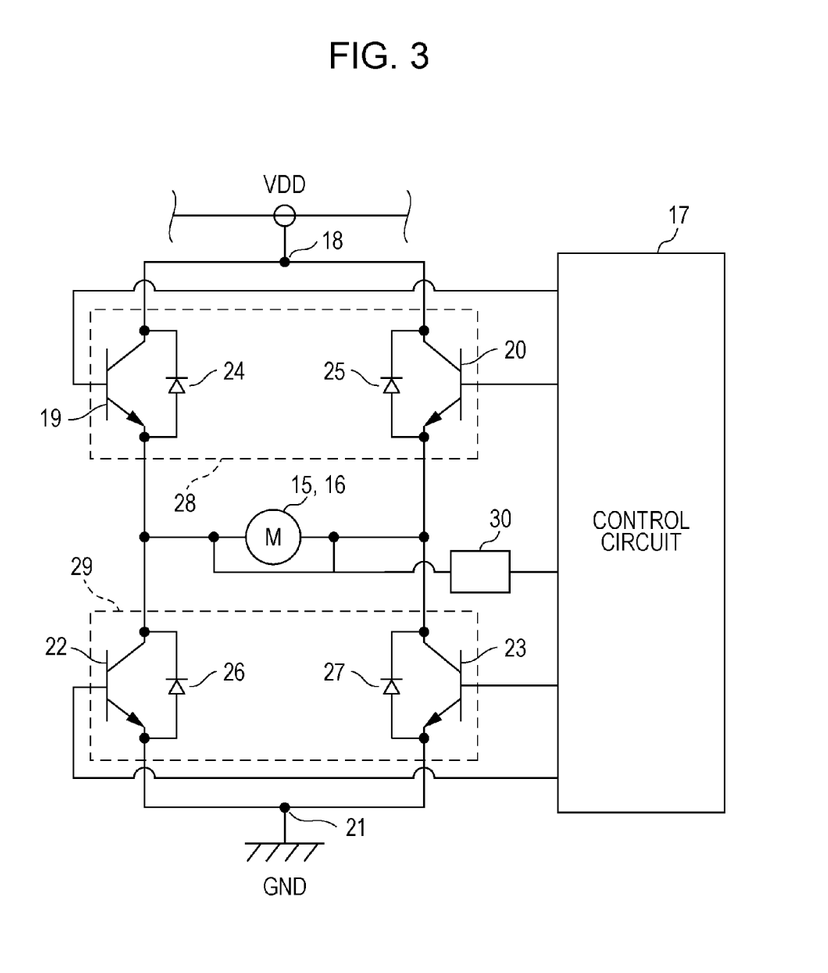
FIG. 3 is a diagram of a motor driving circuit of a recording apparatus according to a second embodiment of the invention.

FIG. 3

Next, a recording apparatus of a second embodiment will be described with reference to the accompanying drawing.

FIG. 3 is a diagram of a motor driving circuit of the recording apparatus 1 according to the second embodiment. Moreover, the same reference numerals are given to configuration members in common with the above embodiment and detailed description will be omitted.

Moreover, the recording apparatus 1 of the embodiment has the same configuration as the recording apparatus 1 of the first embodiment except that a counter electromotive force detection section 30 is provided. Furthermore, similar to the recording apparatus 1 of the first embodiment, in the recording apparatus 1 of the embodiment, a diagram of a motor driving circuit of a winding motor 16 which drives the winding shaft 10 also has the same configuration as that of the diagram of the motor driving circuit of the motor 15. Thus, the following description also serves as description of the motor driving circuit of the winding motor 16 by replacing the motor 15 and the winding motor 16.

As described above, the recording apparatus 1 of the embodiment includes the counter electromotive force detection section 30 and the counter electromotive force detection section 30 detects that the motor 15 generates the counter electromotive force of a predetermined threshold or more. Then, the motor driving circuit of the embodiment controls the motor 15 so that the motor 15 alternately enters the braking state and the non-braking state after the counter electromotive force detection section 30 detects the counter electromotive force of the threshold or more.

Thus, if adverse influences do not affect the control circuit 17 of the motor driving circuit and the like by such a configuration even if the counter electromotive force is generated, in the recording apparatus 1 of the embodiment, the control of the motor 15 by the control circuit 17 can be omitted.

Moreover, for example, the "predetermined threshold" may be predetermined by a user from a viewpoint of a value in which the adverse influences affect the motor driving circuit and the like.

Figure 4:
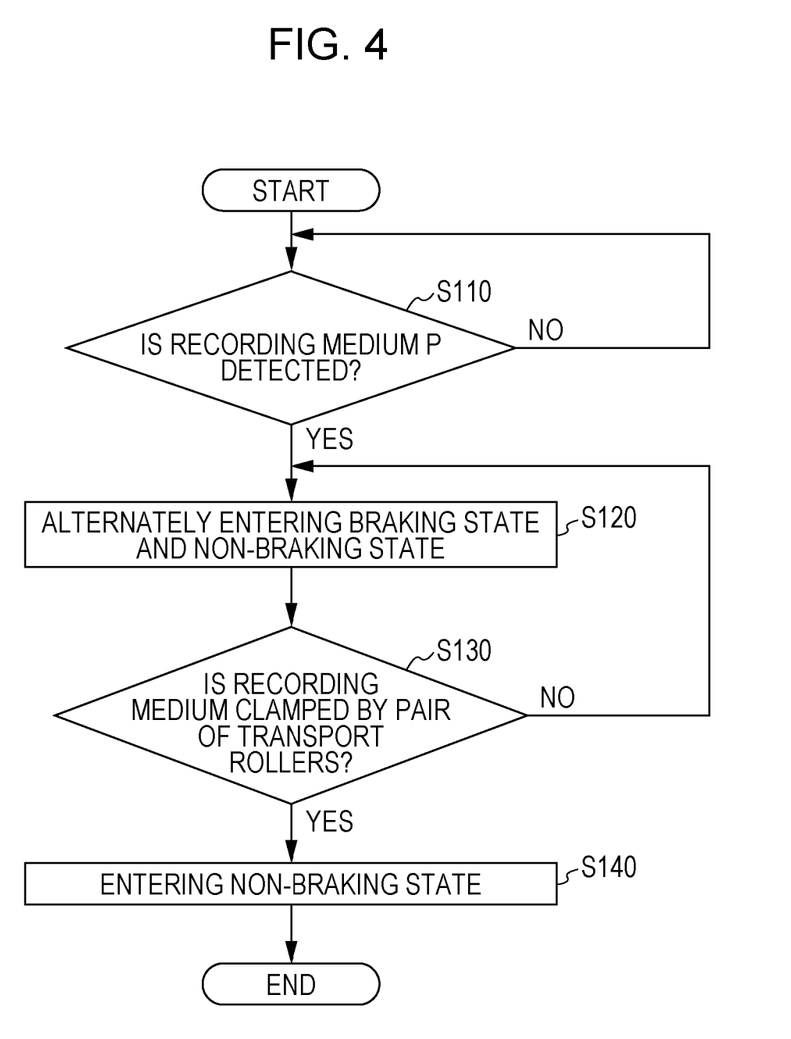
FIG. 4 is a flowchart illustrating an embodiment of a setting method of a recording medium of the invention.

Embodiment of Setting Method of Recording Medium P (FIG. 4)

Next, a setting method of the recording medium P of the embodiment will be described.

FIG. 4 is a flowchart illustrating a setting method of the recording medium P of the embodiment.

Moreover, the setting method of the recording medium P of the embodiment is an embodiment that is performed by using the recording apparatus 1 of the first embodiment. On the other hand, if the setting method is performed by using the recording apparatus 1 of the second embodiment, it is determined whether or not the counter electromotive force detection section 30 detects the counter electromotive force of a predetermined threshold or greater before executing step S120 described below, and if the counter electromotive force of the threshold or more is detected, step S120 may be executed.

In the setting method of the recording medium P of the embodiment, if the recording medium P is mounted on the support shaft 2 by the user and introduction to the transportation path is manually started by the user, initially, in step S110, it is determined whether or not the recording medium detection section 14 detects the recording medium P.

Moreover, the motor 15 may be controlled so as to take the braking state, to take the non-braking state, and to alternately take the braking state and the non-braking state, before it is determined whether or not the recording medium detection section 14 detects the recording medium P.

In step S110, if the recording medium detection section 14 detects the recording medium P, in step S120, the control circuit 17 controls the motor 15 so that the motor 15 alternately enters the braking state (short brake state) and the non-braking state (state where all transistors are open).

Step S120 is performed until the pair of transport rollers formed of the driven roller 8 and the transport roller 9 clamps the recording medium P as represented in the next step S130.

In step S130, it is determined that the pair of transport rollers clamps the recording medium P, the process proceeds to step S140, and the control circuit 17 controls the motor 15 so that the motor 15 continues the non-braking state and the setting method of the recording medium P of the embodiment is completed.

That is, the setting method of the recording medium P of the embodiment is the setting method for setting the recording medium P on the recording apparatus 1 including the support shaft 2 that supports the roll-shaped recording medium P, the motor 15 that applies the rotational force to the support shaft 2, and the control circuit 17 that controls the motor 15. Then, the control circuit 17 controls the motor 15 so that the motor 15 alternately enters the braking state and the non-braking state when manually introducing the recording medium P to a transportation path of the recording medium P.

Thus, when manually introducing the recording medium P to the transportation path of the recording medium P, it is possible to suppress that the motor 15 generates the counter electromotive force and adverse influences affect the control circuit 17 of the motor driving circuit and the like.

The entire disclosure of Japanese Patent Application No. 2013-253385, filed Dec. 6, 2013 is expressly incorporated by reference herein.

What is claimed is:

1. A recording apparatus comprising:
   a support shaft that supports a roll-shaped recording medium;
   a motor that applies a rotational force to the support shaft;
   a recording medium detection section that is provided in a transportation path of the recording medium and detects the recording medium; and
   a motor control section that controls the motor,
   wherein the motor control section is capable of controlling the motor so that the motor alternately enters a braking state and a non-braking state,
   wherein the motor control section controls the motor so that the motor alternately enters the braking state and the non-braking state if the recording medium detection section detects the recording medium in a state where the motor does not apply the rotational force.

2. The recording apparatus according to claim 1,
   wherein the motor control section controls the motor so that the motor alternately enters the braking state and the non-braking state at an interval of 100 ms or greater and 1000 ms or less.

3. The recording apparatus according to claim 1, further comprising:
   a motor driving circuit that has an H-bridge configuration including the motor, a first switch element connected to a power supply terminal and one end of a coil of the motor, a second switch element connected to the power supply terminal and the other end of the coil of the motor, a third switch element connected to a ground terminal and the one end of the coil of the motor, and a fourth switch element connected to the ground terminal and the other end of the coil of the motor,
   wherein the motor control section turns off the first switch element and the second switch element, and turns on the third switch element and the fourth switch element in the braking state, and
   wherein the motor control section turns off all of the first switch element, the second switch element, the third switch element, and the fourth switch element in the non-braking state.

4. The recording apparatus according to claim 1, further comprising:
   a clamping section that is capable of clamping the recording medium in the transportation path of the recording medium,
   wherein the motor control section controls the motor so that the motor enters the non-braking state if the recording medium is in a clamped state by the clamping section.

5. A recording apparatus comprising:
   a support shaft that supports a roll-shaped recording medium;
   a motor that applies a rotational force to the support shaft;
   a motor control section that controls the motor; and
   a counter electromotive force detection section detecting that the motor generates a counter electromotive force of a predetermined threshold or more,
   wherein the motor control section is capable of controlling the motor so that the motor alternately enters a braking state and a non-braking state,
   wherein the motor control section controls the motor so that the motor alternately enters the braking state and the non-braking state after the counter electromotive force detection section detects the counter electromotive force of the threshold or more.

6. A setting method for setting a recording medium on a recording apparatus including a support shaft that supports a roll-shaped recording medium, a motor that applies a rotational force to the support shaft, and a motor control section that controls the motor,
   wherein the motor control section controls the motor so that the motor alternately enters a braking state and a non-braking state when manually introducing the recording medium to a transportation path of the recording medium,
   wherein the motor control section controls the motor so that the motor alternately enters the braking state and the non-braking state at an interval of 100 ms or greater and 1000 ms or less.

* * * * *